(12) United States Patent
Raz et al.

(10) Patent No.: US 6,311,221 B1
(45) Date of Patent: Oct. 30, 2001

(54) STREAMING MODULES

(75) Inventors: Uri Raz, Fairlawn, NJ (US); Yehuda Volk, Tel-Aviv; Shmuel Melamed, Ramat-Gat, both of (IL)

(73) Assignee: AppStream Inc., Palo Alto, CA (US)

( * ) Notice: Subject to any disclaimer, the term of this patent is extended or adjusted under 35 U.S.C. 154(b) by 0 days.

(21) Appl. No.: 09/120,575

(22) Filed: Jul. 22, 1998

(51) Int. Cl.[7] .................................................. G06F 15/16
(52) U.S. Cl. .......................................... 709/231; 709/329
(58) Field of Search .................................... 709/240, 331, 709/219, 329, 231; 707/1

(56) References Cited

U.S. PATENT DOCUMENTS

| | | | |
|---|---|---|---|
| 5,487,167 | * 1/1996 | Dinallo et al. ......................... | 395/650 |
| 5,581,764 | 12/1996 | Fitzgerald et al. ................... | 395/703 |
| 5,708,796 | 1/1998 | Ozden et al. ......................... | 395/494 |
| 5,712,976 | 1/1998 | Falcon, Jr. et al. .................. | 395/200 |
| 5,742,768 | 4/1998 | Gennaro et al. ...................... | 295/200 |
| 5,745,380 | 4/1998 | Sandvoss et al. ................. | 364/514 R |
| 5,754,774 | 5/1998 | Bittinger et al. ...................... | 395/200 |
| 5,761,477 | 6/1998 | Wahbe et al. ......................... | 395/406 |
| 5,764,235 | 6/1998 | Hunt et al. ............................ | 345/428 |
| 5,765,164 | 6/1998 | Prasad et al. ......................... | 707/104 |
| 5,787,284 | * 7/1998 | Blainey et al. ....................... | 395/701 |
| 5,802,292 | * 9/1998 | Mogul .................................. | 709/203 |
| 5,835,749 | * 11/1998 | Cobb .................................... | 395/500 |
| 5,878,223 | 3/1999 | Becker et al. ......................... | 395/200 |
| 5,919,247 | 7/1999 | Van Hoff et al. ..................... | 709/217 |
| 5,933,644 | * 8/1999 | Wallace ................................ | 395/709 |
| 5,974,129 | 10/1999 | Bodnar ................................. | 379/207 |
| 5,978,788 | 12/1999 | Castelli et al. .......................... | 707/2 |
| 5,978,791 | 11/1999 | Farber et al. ............................ | 707/2 |
| 6,003,087 | * 12/1999 | Housel, III et al. ................. | 709/229 |
| 6,009,410 | * 12/1999 | LeMole et al. ........................ | 705/14 |
| 6,073,129 | 6/2000 | Levine et al. ............................ | 707/4 |
| 6,088,524 | 7/2000 | Levy et al. ............................ | 395/603 |
| 6,122,628 | 9/2000 | Castelli et al. .......................... | 707/5 |

FOREIGN PATENT DOCUMENTS

| | | |
|---|---|---|
| WO 97/46955 | 12/1997 | (WO) . |
| WO97/46955 | 12/1997 | (WO) . |

OTHER PUBLICATIONS

Glass, "A Universal Streaming Service," C++ Report, pp. 74–76 and 81–83, Apr. 1996.*

(List continued on next page.)

*Primary Examiner*—Zarni Maung
*Assistant Examiner*—Gary S. Fourson
(74) *Attorney, Agent, or Firm*—James V. Mahon; Clifford Chance Rogers & Wells

(57) ABSTRACT

Computer-implemented methods of transmitting modules between a first computer and a second computer are disclosed. At the first computer, a module set is formed by selecting a sequence of modules from a collection of available modules. Each of the selected modules are associated with an application executing at the second computer. The selected modules may then be transparently streamed from the first computer to the second computer. The selection of modules is made in accordance with predetermined selection criteria and is independent of the second computer's execution environment. At the second computer, received modules may be integrated with the executing application.

Systems for transmitting modules between a first computer and a second computer are also featured. The disclosed systems include a first computer and a second computer. The first computer includes means for executing an application, means for receiving a sequence of modules associated with the application while the application is executing, and means for integrating a first module in the received sequence with the application. The second computer includes means for storing a collection of modules associated with the application, means for selecting a sequence of modules from the collection, and means for transferring the selected sequences from the first computer to the second computer.

24 Claims, 7 Drawing Sheets

OTHER PUBLICATIONS

Ritchey, "Java!", New Riders Publishing, pp. 214–216, Dec. 1995.*

G. Glass, "A Universal Streaming Service", C++ Report, Apr. 1996, pp. 74–83.

T. Ritchey, "Java!", New Riders Publishing, 1995, pp. 214–216.

Chen et al., "Real–Time Video and Audio in the World Wide Web" World Wide Web Journal, Dec. 11–14 1995, pp. 333–348.

Jiang et al., "Prefetching Links on the WWW", Department of Computer Science University of California, 1997, pp. 483–489.

M. Schwartz, "Telecommunication Networks: Protocols, Modeling and Analysis", Addison–Wesley Publishing Company, pp. 266–283.

J. Basu et al., "Degrees of Transaction Isolation in SQL *Cache: A Predicate–based Client–side Caching System", May 15, 1996, pp. 1–22.

Amit Shukla et al., "Storage Estimation for Multidimensional Aggregates in the Presence of Hierarchies", VLDB Conference Mumbai (Bombay), 1996, pp. 522–531.

Dale Skeen, "New Forms Of Persistent Queries Are Necessary To Handle Live Business Data As It Speeds Through A Company", internet website www.byte.com BYTE Magazine, Feb. 1998, pgs.1 & figures.

V. Hoff et al., "The Open Software Description Format (OSD)", internet website www.w3.org, Aug 11, 1997, pp. 1–13.

Red Brick Vista, "Aggregate Computation and Management", internet website www. informix.com, printed Oct. 4, 2000.

Fireclick, "Web Site Performance is Key to E–Commerce Sucess", internet website WWW. Fireclick.com printed, Nov. 1, 2000.

Boost Web Optimizer Technology Overview, "How it Works", Sep. 27, 2000 and internet website www.boostworks.com printed Nov. 1, 2000.

"Delivering Windows to the Net White Paper", WinToNet by Menta Software, 2000 and Website http://216.205.21.102/printed Nov. 1, 2000.

"First There was Streaming Audio, then Streaming Video. Now get ready for Streaming Software", Stream Theory White paper and Website WWW.Streamtheory.com printed Sep. 22, 2000.

"OSD Describing Software Package on the Internet", Marimba Inc. White paper 1998 and wedsite www.marimba.com, printed Nov. 1, 2000.

"Timbale for Windows Terminal Services" Marimba Promotional document, undated, 2000.

Chen, Z. et al., (Dec. 11–14, 1995) "Real time video and audio in the world wide web" *World Wide Web Journal*, Fourth International World Wide Web Conference, pp. 333–348, ( or retrieved on Jun. 29, 1999 from the Internet: <URL:http://www.w3.org/Conferences/WWW4/Papers/211>paragraph 06.2, 14 pages).

Jiang, Z. and Kleinrock, L. (1997) "Prefetching links on the WWW" *IEEE International Conference on Communications* (ICC), US, New York, NY: IEEE, pp. 483–489.

* cited by examiner

STREAMING MODULES

BACKGROUND INFORMATION

In a client-server environment, a client computers can communicate with a server to remotely access information stored at the server. The transfer of information between the server and client computer may be provided using standard protocols and software applications. For example, a hypertext markup language (HTML) browser application at a client computer can communicate over the public Internet using TCP/IP and hypertext transfer protocols (HTTP) to receive web pages from a HTTP server. Web pages may include formatted text as well as multimedia elements, such as embedded graphics and sounds. The multimedia elements may be downloaded by the client and presented to a user by a browser application or a "plug in" browser component. Example browser applications include Netscape Navigator 4.0® and Microsoft Internet Explorer 4.0™.

Browser applications used at client computers can use plug-in software to receive audio and video information using a streaming data transmission protocol. A streaming protocol allows information to be presented by a client computer as it is being received. For example, full-motion video can be sent from a server to a client as a linear stream of frames. As each frame arrives at the client, it can be displayed to create a real-time full-motion video display. Audio and video streaming allows the client to present information without waiting for the entire stream to arrive at the client application. Audio and video streaming are provided by, for example, the RealAudio® and RealVideo™ applications from RealNetworks, Inc.

Browser applications may also make use of executable software applets to enhance the appearance of HTML-based web pages. Applets are software programs that are sent from the server to the client in response to a request from the client. In a typical applet use, HTML-based web pages include HTTP commands that cause a browser application to request an applet from a server and to begin execution of the applet. The applet may thereafter interact with a user to gather and process data, may communicate data across a network, and may display results on a computer output device. Applets may be constructed from a programming language which executes in a run-time environment provided by the browser application at the client computer. For example, the Java® programming language from Sun Microsystems, Inc., allows Java applets to be stored at a web server and attached to web pages for execution by a Java interpreter. Java Applets, may be formed from multiple Java Classes. Java Classes include executable Java code that can be downloaded from a server in response to a dynamically generated request to execute the class (a module execution request). If a Java Class is not available to a Java interpreter when an executing applet attempts to access functionality provided by the Class, the Java interpreter may dynamically retrieve the Class from a server. Other programming languages, such as Microsoft Visual Basic® or Microsoft Visual C++ ®, may also be used to create applet-like software modules, such as Microsoft ActiveX™ controls.

Downloadable applets can also be used to develop large and complex programs. For example, a complex financial program may be constructed from a collection of applets. In such a financial program, separate applets may be used to gather information from a user, compute payments, compute interest, and generate printed reports. As particular program functions are required by a user, the applets associated with the required functions can be retrieved from the server. However, as the size of a software application increases, delays associated with retrieving is modules over a network likewise increase and may be unacceptable to end-users. Consequently, an improvement in the transmission of software modules between computers is desirable.

SUMMARY

The invention includes methods and systems for streaming data modules between a first and a second computer. The modules may be streamed regardless of the existence of a "natural" order among the modules. For example, unlike streaming applications that rely on a natural linear ordering of data to determine the data stream contents, the disclosed streaming mechanism is not constrained to operate according to a linear data ordering. Instead, streamed data modules are selected using predetermined criteria that can be independent of the particular data content.

In an exemplary application, the disclosed streaming mechanism can provide user-dependent streaming of software modules. For example, a home banking application may include modules #1 through #5. A first banking application user may, based on the user's input choices at a menu screen, access the modules in the order 1-3-4-5 while a second user may access the modules in the order 2-4-1. For such a banking application, the predetermined criteria used to determine a streaming sequence may detail each user's module usage pattern. Predetermined criteria associated with the application's users may indicate a preferred streaming sequence 1-3-4-5 when the first user is accessing the banking application but may indicate the preferred sequence 2-4-1 when the second user is accessing the application. The streamed sequence may therefore conform to a historical user-dependent access pattern. Other types of predetermined criteria may also be used. The disclosed streaming mechanism may also be use to stream non-executable data such as hypertext markup language data, binary graphics, and text.

In general, in one aspect, the invention features a computer-implemented method of transmitting modules from a first computer to a second computer. At the first computer, a module set is formed by selecting a sequence of modules from a collection of available modules. Each of the selected modules are associated with an application executing at the second computer. The selected modules may be transparently streamed from the first computer to the second computer. The selection of modules is made in accordance with predetermined selection criteria and is independent of the second computer's execution environment.

Implementations of the invention may include one or more of the following features. A module may include non-executable data, such as hypertext markup language data, and/or program code. The selection criteria may be stored in a streaming control database. The streaming control database may include transition records associating weighted values with transitions between selected modules in the collection. Processing of transition record information, such as by using a path determination algorithm, may be used to determine the sequence of modules. The streaming control database may include list records each of which identifies a predetermined sequences of modules. Selection of modules may be made by selecting a list record. Selecting a sequence of modules may include sending data from the second computer to the first computer to identify each module in the sequence or to identify the status of the executing application. For example, data identifying the status may include a series of user input values.

Implementations may also include one or more of the following features. Streaming of the module set may be interrupted, a second sequence determined, and streaming of the second sequence may occur. The streaming of the module set may be interrupted by a request for a particular module that is sent from the second computer to the first computer. For example, a Java Applet may interrupt a stream of Java Classes by attempting to access a Java Class that has not already been streamed to the second computer. A sequence of modules may be streamed and stored at the second computer independent of the executing application. That is, the executing application need not initiate streaming and need not be aware of the streaming process. Streamed modules may be subsequently integrated with the application at the second computer by interconnecting logic in a streamed module with logic in the application.

Implementations may also include one or more of the following features. The application may include an interrupt statement. Execution of the interrupt statement may transfer control to an executor program. The executor program functions in the manner of a program code debugger by responding to the interrupt statement and preventing the permanent cessation (termination) of the executing application process. The executor program may thereafter integrate logic in a streamed module with the application's logic by replacing the interrupt statement (generally, as part of a block of replacement logic) with replacement logic from the streamed module. The application may thereafter continue executing, generally by executing replacement logic that has been substituted for the interrupt statement. The application may also include a stub procedure that can be replaced by logic in a streamed module. Replacement of the stub procedure may be direct, such as by removing the stub procedure code and replacing it with logic from a streamed module, or replacement may be operative, such as by creating a link to logic in a streamed module.

In general, in another aspect, the invention features a computer program residing on a computer-readable medium. The computer program includes instructions for causing a computer to access a collection of modules associated with an application, to access a database storing module selection criteria, to form a module set by selecting a sequence of modules from the collection in accordance with the module selection criteria, and to transparently stream the module set to a second computer. Implementations of program may also include instructions for causing the computer to retrieve a first module from the collection and to send the first module to the second computer.

In general, in another aspect, the invention features a computer program residing on a computer-readable medium. The program includes instructions for causing a computer to execute an application, to transparently receive a modules associated with the executing application, to store the received module independent of the executing application, and to integrate the received module with the executing application.

In general, in another aspect, the invention features a system for transferring information modules between computers. The system includes a first computer and a second computer. The first computer includes means for executing an application, means for receiving a sequence of modules associated with the application while the application is executing, and means for integrating a first module in the received sequence with the application. The second computer includes means for storing a collection of modules associated with the application, means for selecting a sequence of modules from the collection, and means for transferring the selected sequences from the first computer to the second computer.

Implementations may include one or more of the following advantages. Delays experienced when downloading an applications, a code module, or a data modules can be can be reduced. Software and data modules can be predictively delivered to a client workstation according to a particular end user's requirements. The order in which modules are streamed from a server to a client can be dynamically determined. A collection of module delivery sequences can be associated with a particular application or user and the sequences can be dynamically updated. Module delivery sequences can be determined based on individual software usage patterns or stored statistic associated with module usage. Module streaming can be interrupted and altered during the execution of an application. Implementations may include additional or alternative advantages as will become clear from the description and claims that follow.

DETAILED DESCRIPTION

Figure 1:
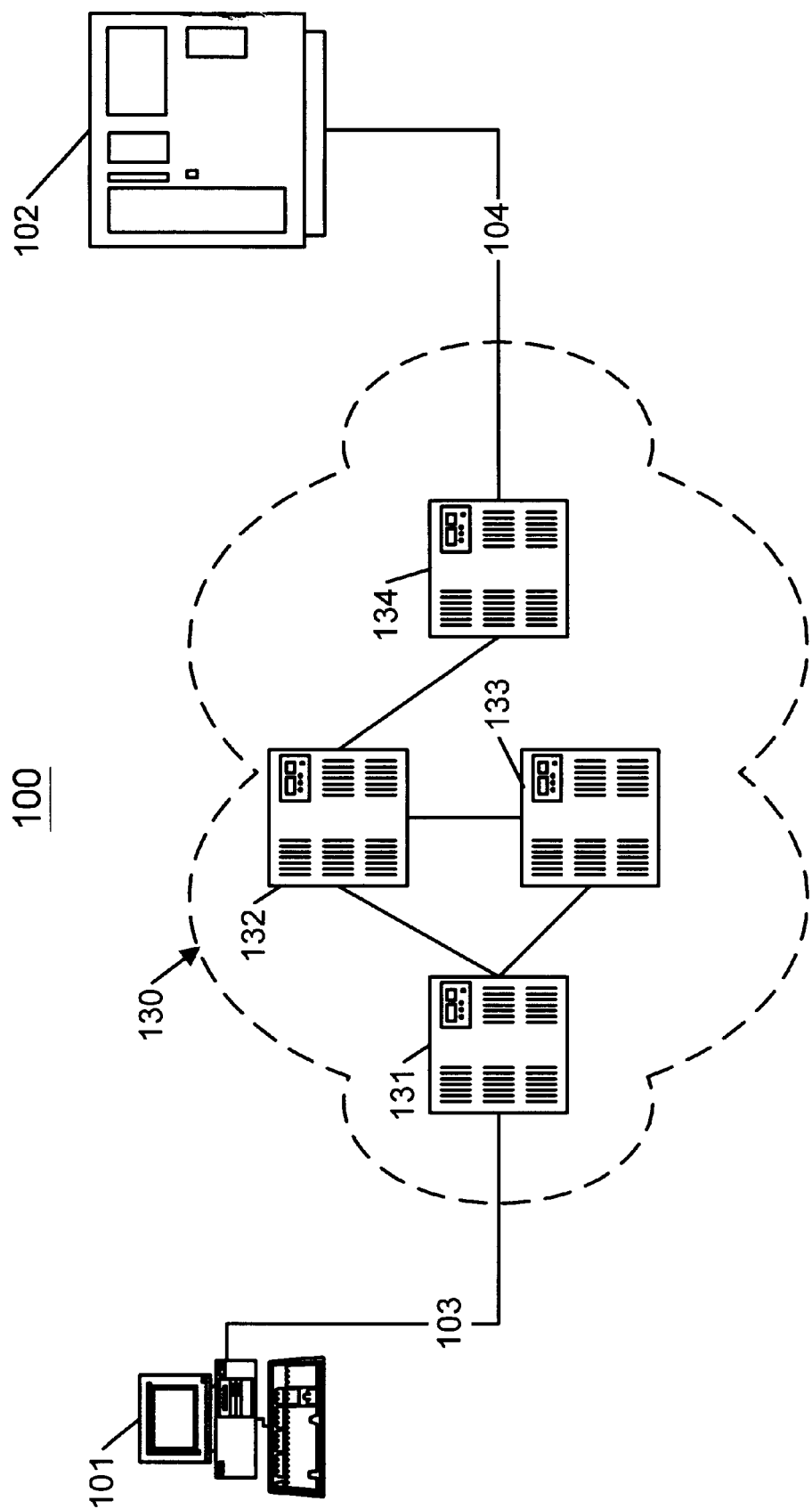
FIG. 1 illustrates a computer network.

Referring to FIG. 1, a wide area network 100 is shown. In the network 100, a client computer 101 can communicate with a server computer 102 by sending data over links 103 and 104 to a data network 130. The data network 130 may include multiple nodes 131–134 that can route data between the client 101 and the server 102. The client computer 101 may transmit and receive data using the TCP/IP, HTTP, and other protocols. For example, the client 101 may use the HTTP protocol to request web pages from the server 102.

Web pages and multimedia data sent from the server 102 to the client 101 may have a natural linear sequence associated with them. The natural sequence of video data may be the linear order of video frames while the natural sequence of text may be the order in which pages of text are arranged in a document. Data having a natural linear sequence can be streamed from a server to a client to minimize download delays. In a streaming system, while earlier items in a liner sequence are being processed and/or displayed, subsequent items may be downloaded to the client computer. When processing and/or display of an item is complete, processing or display or a fully received "streamed" item may quickly begin. Since receipt of a streamed item is fully or partially complete when the item is requested, a user or client application requesting the streamed item will perceive a reduced downloading delay. For example, if the first page of a document is retrieved by a user, the second page can be downloaded while the first page is being read. If the user continues reading at the second page of the document, that page will then be available at the client, such as in a cache area on a hard disk drive, and can be read without additional downloading delay.

Software execution may not follow a predictable natural linear order. Software may include jump statements, break statements, procedure calls, and other programming constructs that cause abrupt transfers of execution among sections of executing code. The execution path that is traversed during the processing of interrelated code modules (such as code segments, code classes, applets, procedures, and code libraries), will often be non-linear, user dependent, may change with each execution of the application program, and may change depending on the state of various data items. Although a natural order may be lacking, an advantageous order may be determined in which to stream modules. The order may be determined using criteria that is independent of the computer's internal architecture or internal operating system (execution environment) considerations.

Figure 2:
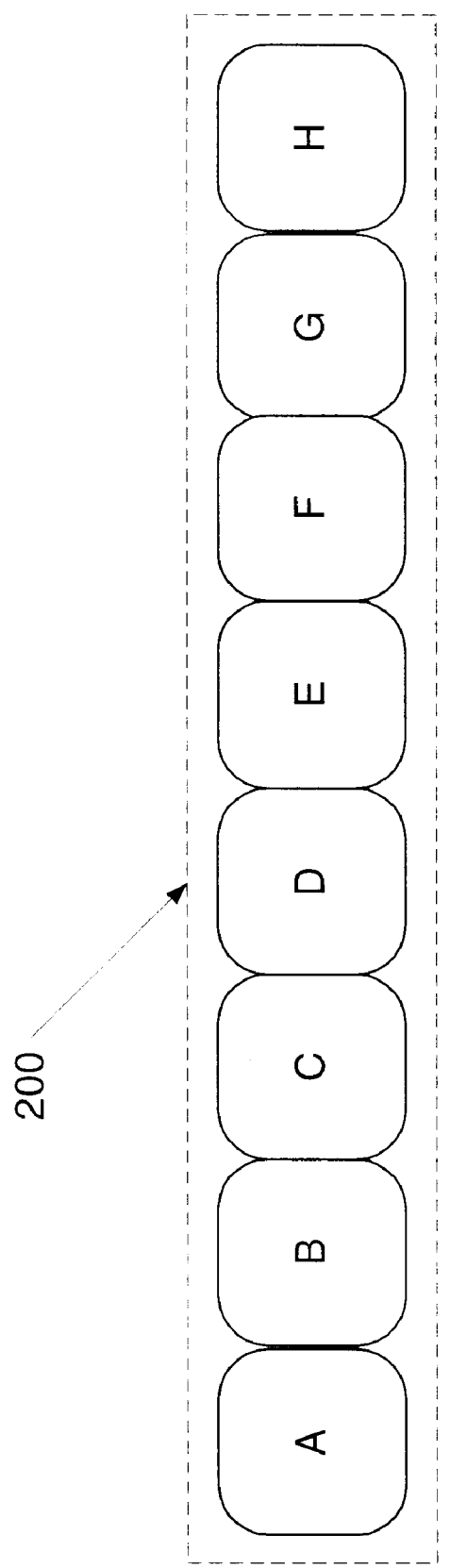
FIG. 2 illustrates computer software application modules.

Referring to FIG. 2, a software application 200 may include multiple modules "A" through "H." Modules "A" through "H" may be Java Classes, C++ procedure libraries, or other code modules that can be stored at a server. Some of the modules "A" through "H" may also be stored at the client computer, such as in a hard disk drive cache or as part of a software library stored at the client computer. When a client computer begins execution of the application 200, a first module, such as module "A," may be downloaded from the server and its execution at the client 410 may begin. As module "A" is being processed, the programming statements contained therein may branch to, for example, module "E." If Module "E" is not already resident at the client, the execution of module "A" can be suspended, module "E" can be retrieved from the server, and then the execution of module "E" code may begin. In such a scenario, a user will experience a module download delay associated with retrieving module "E" from the server.

Figure 4:
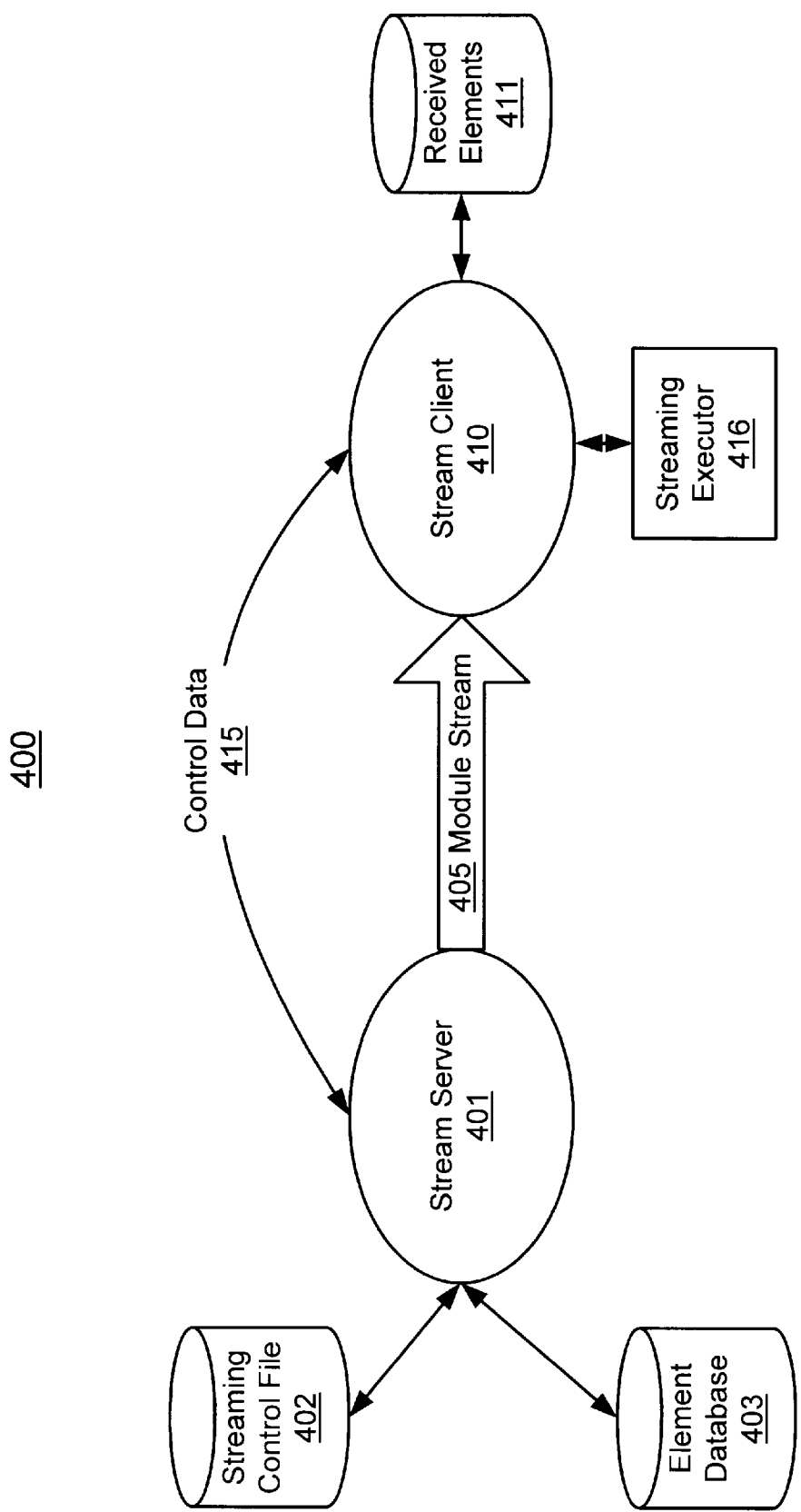
FIG. 4 illustrates a server and a client, according to the invention.

To minimize module download delays experienced by a user, module "E" may be transparently streamed from a server to the client computer. Transparent streaming allows future module use to be predicted and modules to be downloaded while other interrelated modules "A" are executing. Referring to FIG. 4, an exemplary software architecture 400 providing transparent streaming is shown. The software architecture 400 includes a server 401 having a database 403 of stored software modules. The server 401 can transparently transmit a stream of software modules 405 over a communications link to a client computer 410. The communication link may be an analog modem connection, a digital subscriber line connection, a local area network connection, or any other type of data connection between the server 401 and client 410. As particular software modules are being executed at the client 410, additional modules are sent from the server 401 to the client 410. In a dynamic streaming implementation, the order in which modules are streamed between the server and client may be altered based on the particular client computer 410 being served, based on the user of the client computer, and based on other dynamically determined factors.

Figure 3:
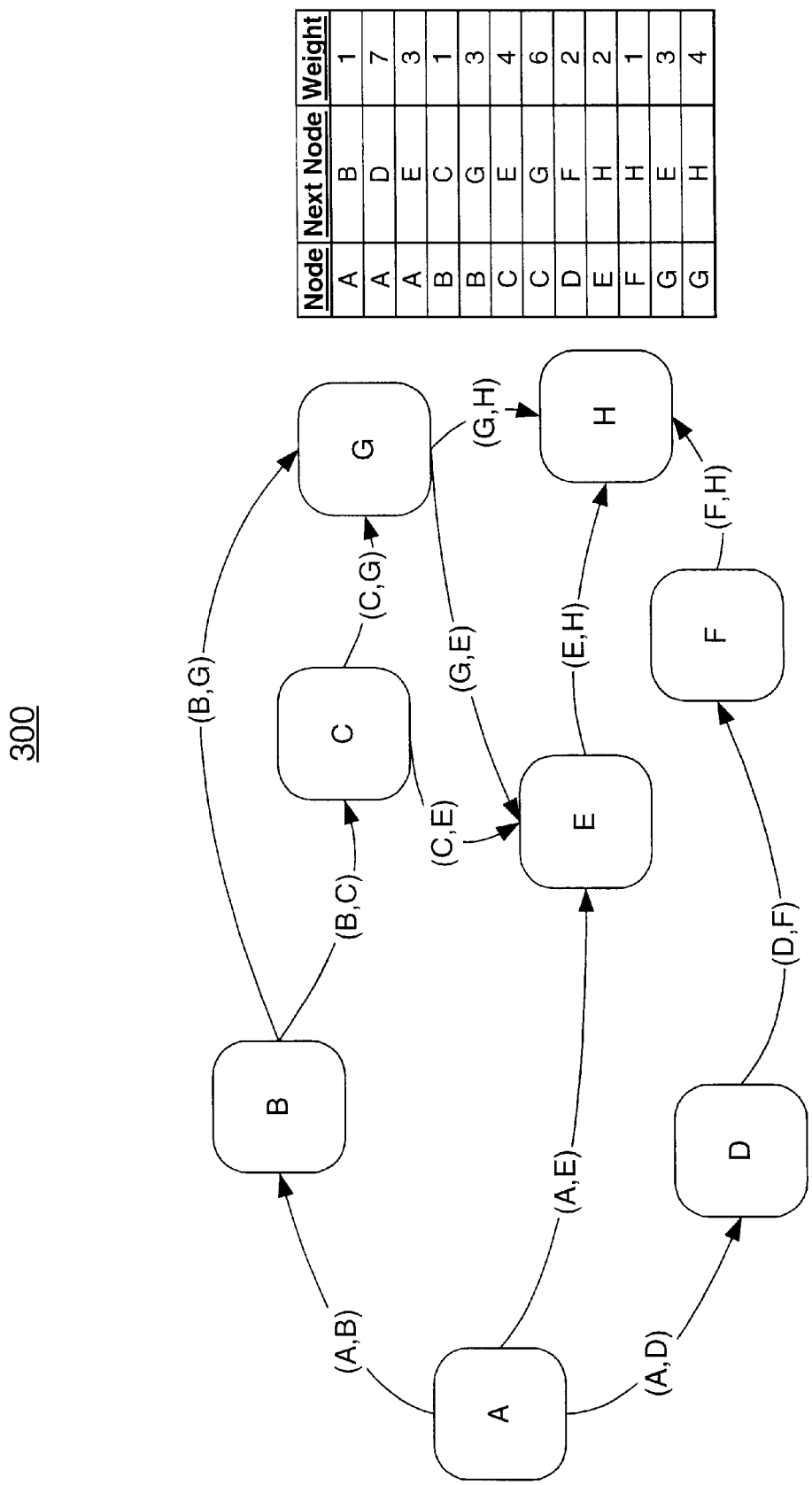
FIG. 3 is a directed graph, according to the invention.

Referring to FIG. 3, the execution order of application modules "A" through "H" may resemble a directed graph 300 rather than a linear sequence of modules. For example, as illustrated by the graph 300, after module "A" is executed, execution can continue at module "B," "D," or "E." After module "B" is executed, execution can continue at module "C" or "G." The execution path may subsequently flow to additional modules and may return to earlier executed modules.

The server 401 can use streaming control information 402 to determine the order in which to stream modules from the server 401 to the client 410. The streaming control information 402 can include, for example, a predicted execution flow between software modules such as that represented by the directed graph 300. As downloaded modules are executed by the client 410, the client may send control data 415 to the server 401 to dynamically update and alter the order in which modules are streamed from the server 401 to the client 410. Control data 415 may be used to request particular modules from the server 401, to send data regarding the current execution state of the application program, to detail the current inventory of modules residing in the client's local storage 411, and to report user input selections, program execution statistics, and other data derived regarding the client computer 410 and its executing software.

The sequence of modules sent in the stream 405 from the server 401 to the client 410 can be determined using a streaming control file 402. The streaming control file 402 includes data used by the server to predict modules that will be needed at the client 410. In a graph-based implementation, the control file 402 may represent modules as nodes of a directed graph. The control file 402 may also represent possible execution transitions between the modules as vertices ("edges") interconnecting the nodes. Referring to Table 1, in a weighted graph implementation, the streaming control file 402 may include a list of vertices represent possible transitions between modules. For example, Table 1 list vertices representing all possible transitions between the modules "A" through "H" of graph 300 (FIG. 3). Each vertex in Table 1 includes a weight value indicating the relative likelihood that the particular transitions between modules will occur. In the example of Table 1, higher weight values indicate less likely transitions. The server 401 may apply a shortest-path graph traversal algorithm (also known as a "least cost" algorithm) to determine a desirable module streaming sequence based on the currently executing module. Example shortest-path algorithms may be found in *Telecommunications Networks: Protocols, Modeling and Analysis,* Mischa Schwartz, Addison Wesley, 1987, §6.

TABLE 1

Graph Edge Table

| Edge | Weight |
|---|---|
| (A, B) | 1 |
| (A, D) | 7 |
| (A, E) | 3 |
| (B, C) | 1 |
| (B, G) | 3 |
| (C, E) | 2 |
| (C, G) | 6 |
| (D, F) | 2 |
| (E, H) | 2 |
| (F, H) | 1 |
| (G, E) | 3 |
| (G, H) | 4 |

For example, Table 2 represents the minimum path weight between module "A" and the remaining modules of Table 1.

TABLE 2

Shortest Paths from Application Module "A"

| From | To | Shortest Path Weight | Path |
|---|---|---|---|
| A | B | 1 | A-B |
|   | C | 2 | A-B-C |
|   | D | 7 | A-D |
|   | E | 3 | A-E |
|   | F | 9 | A-D-F |
|   | G | 4 | A-B-G |
|   | H | 5 | A-E-H |

Based on the weight values shown in Table 2, the server 401 may determine that, during the execution of module "A", the module streaming sequence "B," "C," "E," "G," "H," "D," "F" is advantageous. If a particular module in a determined sequence is already present at the client 402, as may have been reported by control data 415, the server 401 may eliminate that module from the stream of modules 405. If, during the transmission of the sequence "B," "C," "E," "G," "H," "D," "F," execution of module "A" completes and execution of another module begins, the server may interrupt the delivery of the sequence "B," "C," "E," "G," "H," "D," "F," calculate a new sequence based on the now executing module, and resume streaming based on the newly calculated streaming sequence. For example, if execution transitions to module "B" from module "A," control data 415 may be sent from the client 410 to the server 401 indicating that module "B" is the currently executing module. If module "B" is not already available at the client 410, the server 401 will complete delivery of module "B" to the client and determine a new module streaming sequence. By applying a shortest-path routing algorithm to the edges of Table 1 based on module "B" as the starting point, the minimum path weights between module "B" and other modules of the graph 300 (FIG. 3) can be determined, as shown in Table 3.

TABLE 3

Shortest Paths from Module "B"

| From | To | Shortest Path Weight | Path |
|---|---|---|---|
| B | C | 1 | B-C |
|   | E | 5 | B-C-E |
|   | G | 3 | B-G |
|   | H | 7 | B-C-E-H |

Based on the shortest path weights shown in Table 3, the server 401 may determine that module streaming sequence "C," "G," "E," and "H" is advantageous.

Other algorithms may also be used to determine a module streaming sequence. For example, a weighted graph 300 may be used wherein heavier weighted edges indicate a preferred path among modules represented in the graph. In Table 4, higher assigned weight values indicate preferred transitions between modules. For example, edges (A,B), (A,D), and (A,E) are three possible transitions from module A. Since edge (A,B) has a higher weight value then edges (A,D) and (A,E) it is favored and therefore, given module "A" as a starting point, streaming of module "B" before modules "D" or "E" may be preferred. Edge weight values can be, for example, a historical count of the number of times that a particular module was requested by a client, the relative transmission time of the code module, or a value empirically determined by a system administrator and stored in a table 402 at the server 401. Other edge weight calculation methods may also be used.

TABLE 4

Preferred Path Table

| Edge | Weight |
|---|---|
| (A, B) | 100 |
| (A, D) | 15 |
| (A, E) | 35 |
| (B, C) | 100 |
| (B, G) | 35 |
| (C, E) | 50 |

TABLE 4-continued

Preferred Path Table

| Edge | Weight |
|---|---|
| (C, G) | 20 |
| (D, F) | 50 |
| (B, H) | 50 |
| (F, H) | 100 |
| (G, E) | 35 |
| (G, H) | 25 |

In an preferred-path (heavy weighted edge first) implementation, edges in the graph 300 having higher weight values are favored. The following exemplary algorithm may be used to determine a module streaming sequence in a preferred-path implementation:

1: Create two empty ordered sets:
   i) A candidate set storing pairs (S,W) wherein "S" is a node identifier and "W" is a weight of an edge that may be traversed to reach node "S."
   ii) A stream set to store a determined stream of code modules.
2: Let $S_i$ be the starting node.
3: Append the node $S_i$ to the Stream Set and remove any pair ($S_i$, W) from the candidate set.
4: For each node $S_j$ that may be reached from node $S_i$ by an edge ($S_i$, $S_j$) having weight $W_j$:
   {
   If $S_j$ is not a member of the stream set then add the pair ($S_j$, $W_j$) to the candidate set.
   If $S_j$ appears in more than one pair in the candidate set, remove all but the greatest-weight ($S_j$, W) pair from the candidate set.
   }
5: If the Candidate set is not empty
   Select the greatest weight pair ($S_k$, $W_k$) from the candidate set.
   Let $S_i = S_k$
   Repeat at step 3

For example, as shown in Table 5, starting at node "A" and applying the foregoing algorithm to the edges of Table 4 produces the stream set {A, B, C, E, H, G, D, F}:

TABLE 5

Calculation of Stream Set

| Iteration | {Stream Set}/{Candidate Set} |
|---|---|
| 1 | {A}/{(B,100) (D,15) (E,35) } |
| 2 | {A,B}/{(D,15)(E,35)(C,100)(G,35)} |
| 3 | {A, B, C}/{(D,15) (E,35) (G,35)} |
| 4 | {A, B, C, E}/{(D,15) (G,35) (H,50)} |
| 5 | {A, B, C, E, H}/{(D,15) (G,35)} |
| 6 | {A,B,C,B,H,G}/{(D,15)} |
| 7 | {A,B,C,E,H,G,D}/{(F,50)} |
| 8 | {A,B,C,E,H,G,D,F}/{} |

Implementations may select alternative algorithms to calculate stream sets.

Figure 5B:
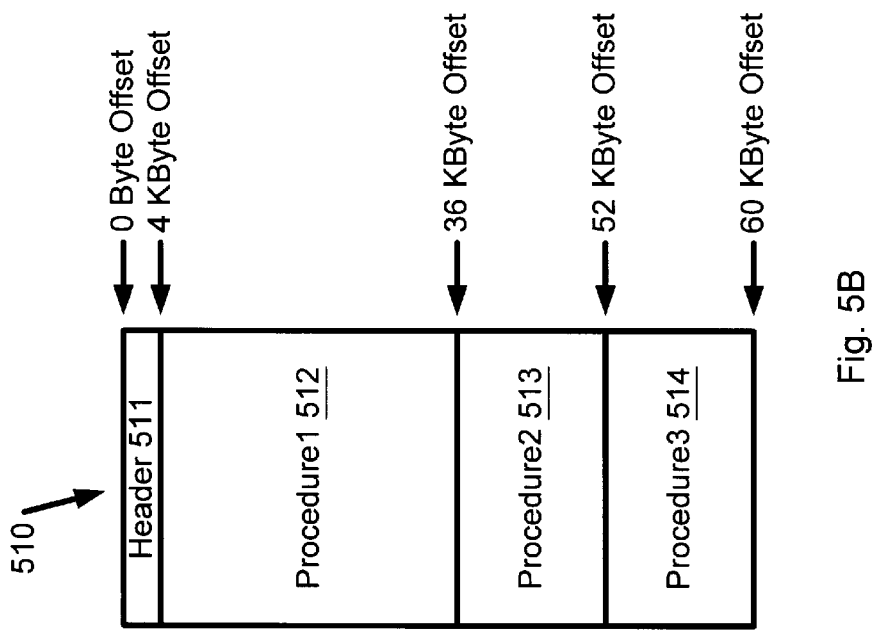
FIGS. 5A–5E illustrate application code components, according to the invention.
Figure 5A:
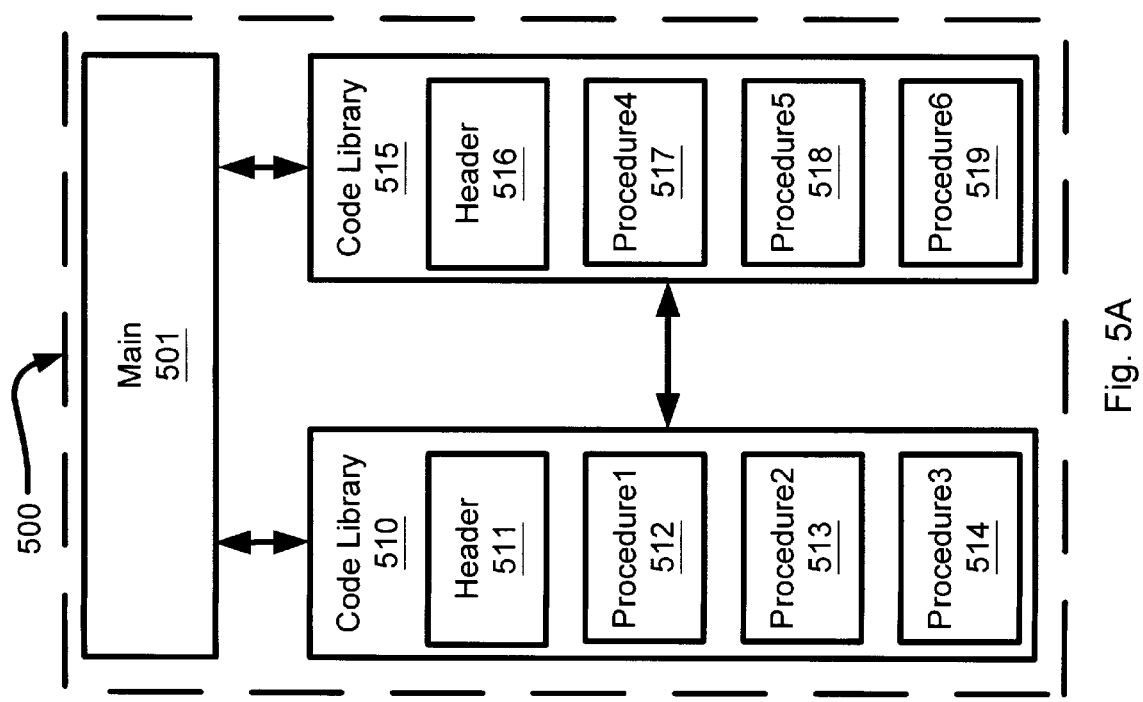

Application streaming may also be used to stream subsections of an application or module. For example, subsections of compiled applications, such as applications written in C, C++, Fortran, Pascal, or Assembly language may be streamed from a server 401 to a client 410. Referring to FIG. 5A, an application 500 may include multiple code modules such as a main code module 501 and code libraries 510 and 515. The module 501 contains program code that is executed when the application is started. The code libraries 510 and 515 may contain header data 511 and 516 as well as executable procedures 512–514 and 517–519 that are directly or indirectly called from the main module 501 and other library procedures.

In a Microsoft Windows 95/Microsoft Visual C++ implementation, the main code module 501 may contain a compiled C++ "main" procedure and the library modules 510 and 515 may be dynamic link libraries having compiled C++ object code procedures. Header data 511 and 516 may include symbolic names used by operating system link procedures to dynamically link libraries 510 and 515 with the main module 501. Header data may also indicate the location of each procedure within the library. In a jump table implementation, a calling procedure may access library procedures 512–514, 517–519 by jumping to a predetermined location in header 511 or 516 and from there, accessing additional code and/or data resulting in a subsequent jump to the start of the procedure.

Figure 5D:
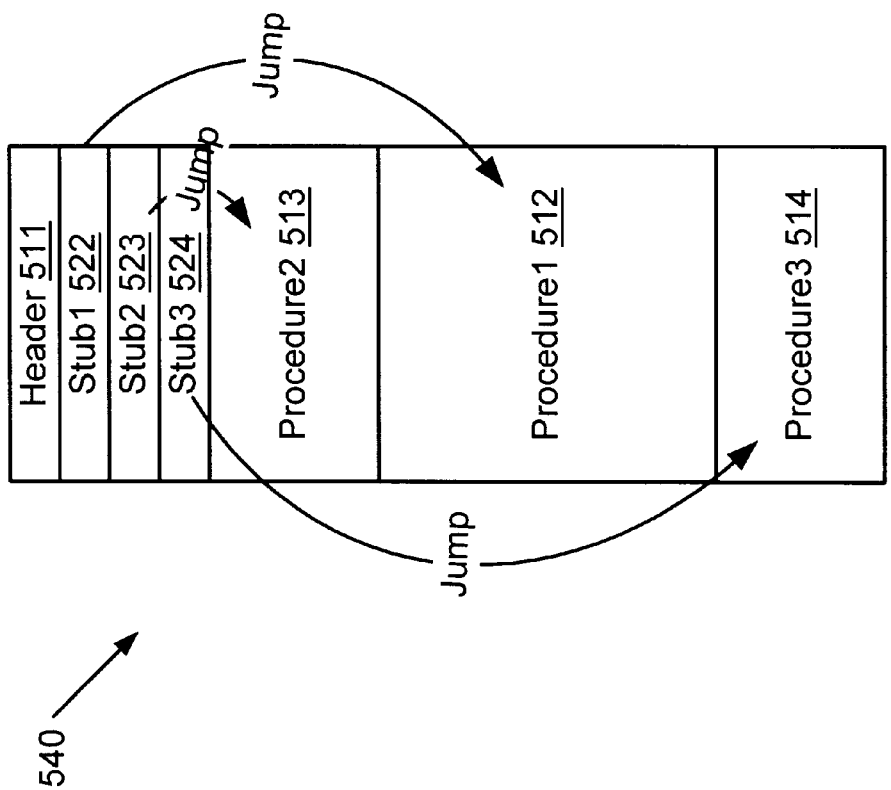
Figure 5C:
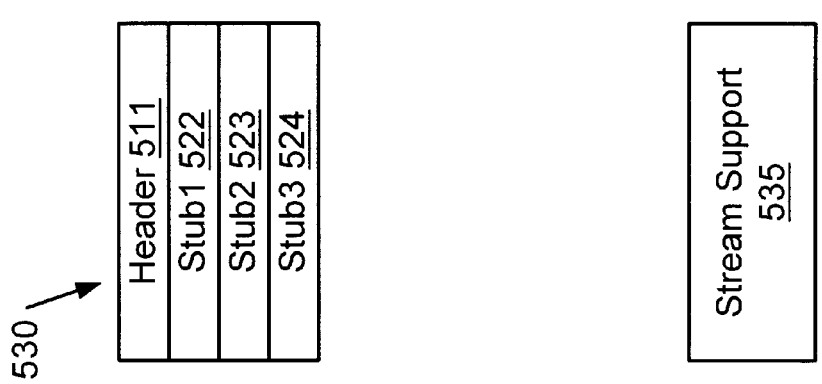
Figure 5E:
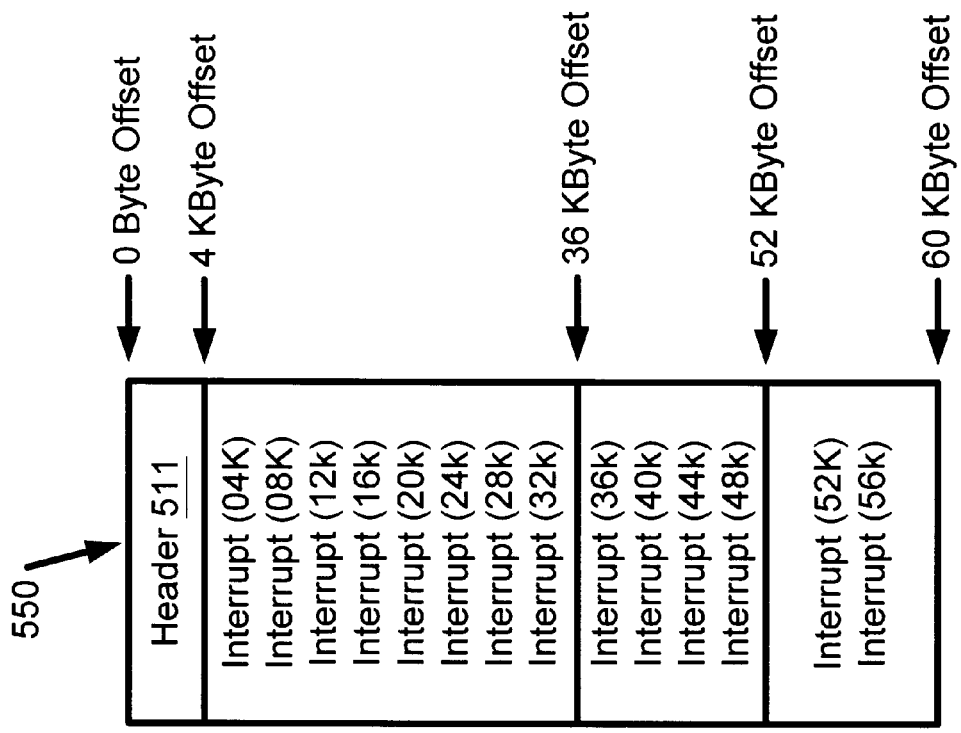

Data and procedures within an application's code modules and libraries may be many hundreds or thousands of bytes long. Prior to executing an application, a client may need to retrieve a lengthy set of modules and libraries. By reducing the size of the module and library set, the initial delay experienced prior to application can be reduced. In a streaming implementation of application 500, code within subsections of the application's code modules can be removed and replaced by shortened streaming "stub" procedures. The replacement of application code with streaming stub procedures may reduce module size and associated transmission delay. For example, referring to FIGS. 5A and 5B, the code library 510 may include a header 511 that is 4 kilobytes (Kbytes) in length and procedures 512–514 that are, respectively, 32 Kbytes, 16 Kbytes, and 8 Kbytes. Referring to FIGS. 5B and 5C, to reduce the size of the library 510, procedures code 512–514 may be removed from the library 510 and stored in a streaming code module database 403 at the server 401 (FIG. 4). The removed procedure code 512–514 may be replaced by "stub" procedures 522–524 resulting in reduced-size code library 530 that can be linked with application modules 501 and 515 in place of library 510. Header data 511 of library 530 can include updated jump or link information allowing stub procedures 522–524 to act as link-time substitutes for procedures 512–514.

A server 401 may provide a streaming-enabled version of application 500 to a client 410 by sending main module 501, library module 515, "streamed" library 530, and, in some implementations, a streaming support file 535 to the client 410 in response to a request for the application 500. The streaming support file 535 may include procedures accessed by the stubs 522–524 to facilitate code streaming between the server 401 and client 410. At the client 410, modules 501, 515, 530 and 535 can be linked and execution of the resulting application can begin. As the main module 501 and various called procedures are executed at the client 410, code modules stored in the database 403 can be streamed from the server 401 to the client 410. Data may be included in the stream 403 to identify stub procedures 522–524 associated with the streamed code modules. As the streamed modules are received at the client, they are integrated with the executing application.

In an appended module implementation, streamed code modules are integrated with the executing application by appending received modules to their corresponding library or code file. For example, referring to FIGS. 5C and 5D, as modules 512–514 are streamed from the server to the client, they are appended to the library file 530 thereby forming an augmented library file 540. As the modules 512–514 are streamed from the server 401 and appended to the file 530, header data 511 or stub data 522–524 is updated so that the now-appended modules are accessible from a calling procedure. For example, referring to FIG. 5D, an additional "jump" may be added between each stub procedure 522–524 and its associated appended module 512–514. Alternatively, header data 511 may be updated so that procedures 512–514 are accessible in place of stubs 522–524. In a stub-replacement implementation, stubs 515–516 are replaced by procedure modules 512–514 as the modules are received from the server 401. Stub replacement may require altering or rearranging the location of the remaining stubs or procedures within a code module or library as replacement code is received. Implementations may employ still other methods of integrating streamed code with executing applications and modules.

In some scenarios, removed code, such as procedure code 512–514 which, in the example given, was replaced by stubs 515–517, may be required (called by another procedure) before it is streamed from the server 401 and integrated with the module 530. In such a case, stub code 522–524 may access streaming functions in the streaming support library 535 to obtain the required procedure. To do so, the streaming support library 535 may send control data 415 to the server 401 to request the needed procedure. In response, the server 401 can halt the current module stream 405 and send the requested module. Upon receipt of the requested module, procedures in the streaming support library 535 may be used to integrate the received module with the application and to continue with the execution of the requested module. The server may thereafter determine a new module stream based on the requested module or other control data 415 that was received from the client.

Code modules may be reduced in size without the use of stub procedures. For example, referring again to FIGS. 4, 5A, 5B, and 5E, in a interrupt driven implementation, procedure code 512–514 may be removed from a code library 510 and stored in a database 403. Header information 511 as well as data indicating the size and location of removed procedure code 512–514 may then be transmitted to a client 410. The client 410 may construct a new library 550 by appending a series of interrupt statements in place of the removed procedure code 512–514. When the application 500 is executed, the code library 550 is substituted for the library 510 and execution of the program 500 may begin. As the program 500 executes, the removed procedure code 512–514 can be streamed to the client 410 and stored in a local database 411. If the application 500 attempts to execute procedure code 512–514 it may instead execute one of the interrupt statement that have replaced procedure code 512–514. The execution of the interrupt statement halts the execution of the program 500 and transfers control to a streaming executor program 416.

Executor 416 implements interface technology similar to that of a conventional run-time object code debugger thereby allowing the executor 416 to intercept and process the interrupt generated by the application 500. When the interrupt is intercepted by the executor 416, data provided to the executor 416 as part of the client execution platform (operating system) interrupt handling functionality can be used to identify the module 550 in which the interrupt was executed and the address of the interrupt code within the module. The executor 416 then determines whether procedure code 512–514 associated with the interrupt location has been received as part of the module stream 415 sent to the client. If the appropriate procedure code has been received, the executor 515 replaces the identified interrupt with the its corresponding code. For example, procedures 512–514 may be segmented into 4 Kilobyte code modules that are streamed to the client 410. When an interrupt statement is executed by the application 500, the executor 416 intercepts the interrupt, determines an appropriate 4 Kilobyte code block that includes the interrupt statement, and replaces the determined code block with a received code module. If the appropriate code module has not yet been received, an explicit request may be sent from the client 410 to the server 401 to retrieve the code module prior to its insertion in the library 550. The executor 416 may thereafter cause the application 500 to resume at the address of the encountered interrupt.

Implementations may also stream entire modules or libraries. For example, main code module 501 may be received from the server 401 and begin execution at the client 410 while code libraries 510 and 515 are streamed from the server 401 to the client 410. Integration of streamed modules with executing modules may be provided by client 410 dynamic module linking facilities. For example, delay import loading provided by Microsoft Visual C++ 6.0 may be used to integrate streamed modules 510 and 515 with executing modules 501. Dynamic linking of streamed modules may be facilitated by storing the streamed modules on a local hard disk drive or other storage location accessible by client 410 link loading facilities. In an exemplary implementation, streaming is facilitated by altering client 410 operating system link facilities such that the link facility can send control data 415 to the server 401 to request a particular module if the module is has not already been streamed to the client 401.

In a protected-memory computer system, direct manipulation of executing application code and data may be restricted. In such systems, a "kernel" level processes or procedure may be required to support integration of streamed modules with executing application. In such a case, streaming support 535 may be pre-provisioned by installing support procedures at the client 410 prior to the client's request for the application 500.

Other methods of determining stream sets may be used. In a list-based implementation, the streaming control file may include predetermined list of module streaming sequences. For example, the streaming control file 402 may include a module streaming sequence list associated with a first user and a second module streaming sequence list associated with a second user. Control data 415 sent from the client 410 to the server 401 may identify the current user at the client 410. Once the user has been identified to the server, the server may stream software modules in accordance with the user's associated streaming sequence list. User-based streaming data may be advantageous where a user's past behavior can be used to anticipate the order of modules to be accessed by that user.

In graph-based streaming control file implementations, the weight of edges connecting nodes may be determined statically or dynamically and may be determined based on a collection of historical usage data. For example, in a programmer-controlled implementation, a software programmer estimate the likelihood that particular transitions between nodes will occur based on the programmer's knowledge of the software code and the expected application usage patterns. Alternatively, application profiling programs may be used to gather run-time execution data recording transitions between various applets, Classes or code modules and thereby determine the likelihood that particular transitions will occur. In a client-feedback implementation, control data 415 sent from the client 410 to the server 401 during module execution is used to build a statistical database of module usage and, based on that database, determine the module streaming order.

In a client-controlled streaming implementation, streaming control data 402 may be located at the client 410 and control data 415 sent from the client 410 to the server 401 may be used to sequentially request a stream of modules from the server. For example, while the client computer 410 is executing a first module, a background process may send control data 415 to a server to request additional modules that can be buffered on a hard disk 411 at the client computer 410. A client-controlled streaming implementation may used existing HTTP servers and HTTP protocols to send request from the client 410 to the server 401 and send software modules from the server 401 to the client 410. Furthermore, although streaming of software modules has been emphasized in the foregoing description, non-executable data, such as hypertext markup language, binary graphic files, and text, may be streamed as a collection of modules.

Implementations may include a "handshaking" procedure whereby, at the start of application execution, control data 415 is sent between the server 401 and the client 410. The handshaking data may include an inventory of application modules residing at the client and at the server. Such handshaking data allows both the client 410 and server 401 to determine their respective software module inventory and to optimize the stream of software modules based on that inventory information.

In a history-dependent implementation, a server or client can store data about a series of transitions between modules and calculate a new module stream based on a history of transitions. For example, referring to FIG. 3, if the module "G" was reached by the path A-B-G, then a server or client may determine that module "E" followed by "H" is to be streamed. On the other hand, if the module "G" was reached by the path A-B-C-G then the streaming sequence may include only the module "H."

The invention may be implemented in computer hardware, firmware, software, digital electronic circuitry or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory.

Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

What is claimed is:

1. A computer-implemented method of transmitting a software application comprising a collection of executably interrelated modules from a first computer system storing the application to a second computer providing an execution environment for executing the application, the method comprising:

forming a module set by ordering a sequence of modules from the collection in accordance with predetermined criteria predicting an order of execution of the modules at the second computer; and transparently streaming the predictively ordered sequence of modules from the first computer to the second computer, said sequence of modules being configured to be integrated at the second computer with other ones of the collection of modules to provide executable functionality of the software application.

2. The method of claim 1 wherein streaming comprises sending a module in the sequence from the first computer to the second computer while executing the application at the second computer.

3. The method of claim 1 wherein at least one module in the collection comprises non-executable data.

4. The method of claim 1 wherein at least one module in the collection comprises program code.

5. The method of claim 1 wherein the predetermined criteria comprise data stored at the first computer in a streaming control database and wherein the method further comprises:

receiving a module request at the first computer from the second computer; and modifying the predictive data stored in the streaming control database based on the module request.

6. The method of claim 5 wherein:

the streaming control database comprises transition records;

the transition records associate weighted values with transitions between selected modules in the collection; and selecting a sequence comprises selecting an ordered set of modules based on transition record values.

7. The method of claim 6 wherein selecting based on transition record values comprises processing transition record information using a path determination algorithm; and modifying comprises modifying the weighted values.

8. The method of claim 5 wherein:

the streaming control database comprises a plurality of list records;

each of the plurality of list records identifies a sequence of modules in the collection; and selecting a sequence comprises selecting one of the plurality of list records.

9. The method claim 1 wherein:

ordering the sequence of modules comprises ordering at the first computers, and the predetermined criteria comprises criteria stored at the first computer.

10. The method of claim 1 further comprising:

interrupting the streaming of the module set;

forming a second module set by selecting a second sequence of modules in accordance with the predetermined criteria; and streaming the second module set from the first computer to the second computer.

11. The method of claim 10 further comprising:

transmitting status data from the second computer to the first computer; and determining the second module set based on the status data.

12. The method of claim 10 wherein status data comprises data indicative of user input.

13. The method of claim 10 wherein interrupting comprises:

sending a module request from the second computer to the first computer; and transmitting the requested module from the first computer to the second computer.

14. The method of claim 13 wherein the module request is sent in response to an attempt to execute code in the requested module prior to streaming of the requested module to the second computer.

15. The method of claim 13 wherein the program is a Java Applet and wherein sending the module request and transmitting the requested module comprise dynamically loading a Java class from the first computer.

16. The method of claim 1 wherein streaming comprises:

receiving a first module in the module set while the application is executing; and storing the first module on local storage media at the second computer;

and wherein the method further comprises integrating the first module with the application.

17. The method of claim 16 wherein integrating the first module comprises integrating logic contained in the first module with logic contained in the application.

18. The method of claim 17 wherein:

the application comprises an interrupt statement;

logic contained in the first module comprises executable replacement code; and integrating the first module comprises:
  executing the interrupt statement,
  invoking an executor program,
  replacing the interrupt statement with the replacement code; and
  executing the replacement code.

19. The method of claim 17 wherein:

the application comprises a first stub procedure;

the module set comprises a first code sequence; and integrating the module set comprises operatively substituting the first code sequence for the first stub procedure.

20. The method of claim 19 wherein operatively substituting comprises altering the first stub procedure to enable application execution to transition from the application to the first code sequence.

21. A computer program residing on a computer-readable medium, comprising instructions for causing a computer to:

access a collection of executably interrelated modules, the modules being configured for integration together to provide software application functionality enabled by executing the modules in an execution-time-determined order;

access a database storing module selection criteria comprising data predicting an order of execution of the interrelated modules;

form a module set by selecting a sequence of modules from the collection in accordance with the module selection criteria; and transparently stream the sequence of modules to a second computer.

22. The computer program of claim 21 wherein the instructions for causing a computer to transparently stream further comprise instructions for causing the computer to:

retrieve a first module from the collection; and send the first module to the second computer.

23. A computer program residing on a computer readable medium, comprising instructions for causing a computer to:

execute an application comprising functionality provided by executable modules that are configured to be integrated together in an execution-time-determined order;

transparently receive modules implementing functionality of the executing application, in a sequence determined at a server based on a predicted execution of the modules by the application;

store the received modules independent of the executing application; and integrate ones of the received modules with the executing application in accordance with the execution-time-determined order.

24. A system for transferring a software application comprising a plurality of executably interrelated modules between computers, the system comprising:

1) a first computer, the first computer comprising:
   a. means for executing modules of the application,
   b. means for receiving a sequence of the modules while the application is executing, and
   c. means for executably integrating a first module in the received sequence with the executing application to provide software-implemented functionality of the application; and 2) a second computer, the second computer comprising:
   a. means for storing a collection of executably interrelated modules associated with the application,
   b. means for selecting a sequence of modules from the collection in accordance with predetermined criteria predicting an order of execution of the modules at the first computer, and
   c. means for transferring the selected sequences from the second computer to the first computer.

* * * * *

UNITED STATES PATENT AND TRADEMARK OFFICE
CERTIFICATE OF CORRECTION

PATENT NO.   : 6,311,221 B1
DATED        : October 30, 2001
INVENTOR(S)  : Raz et al.

It is certified that error appears in the above-identified patent and that said Letters Patent is hereby corrected as shown below:

<u>Column 13,</u>
Line 63, "computers" should read -- computer --.

Signed and Sealed this

Twenty-first Day of May, 2002

*Attest:*

JAMES E. ROGAN
*Attesting Officer*   *Director of the United States Patent and Trademark Office*